United States Patent
Watson et al.

(10) Patent No.: US 9,137,734 B2
(45) Date of Patent: Sep. 15, 2015

(54) MOBILE DEVICE CONFIGURATION BASED ON STATUS AND LOCATION

(75) Inventors: Josh Watson, Seattle, WA (US); Nghiep Duong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 442 days.

(21) Appl. No.: 13/075,498

(22) Filed: Mar. 30, 2011

(65) Prior Publication Data
US 2012/0254382 A1  Oct. 4, 2012

(51) Int. Cl.
| | |
|---|---|
| G06F 15/177 | (2006.01) |
| H04W 48/04 | (2009.01) |
| H04W 4/02 | (2009.01) |
| H04W 64/00 | (2009.01) |
| H04W 4/20 | (2009.01) |
| H04W 8/22 | (2009.01) |
| H04N 21/414 | (2011.01) |
| H04N 21/422 | (2011.01) |
| H04N 21/4223 | (2011.01) |
| H04N 21/439 | (2011.01) |
| H04N 21/4402 | (2011.01) |
| H04N 21/442 | (2011.01) |

(52) U.S. Cl.
CPC ............ *H04W 48/04* (2013.01); *H04W 4/02* (2013.01); *H04W 4/021* (2013.01); *H04W 4/206* (2013.01); *H04W 64/00* (2013.01); *H04N 21/41407* (2013.01); *H04N 21/422* (2013.01); *H04N 21/4223* (2013.01); *H04N 21/42203* (2013.01); *H04N 21/4396* (2013.01); *H04N 21/4398* (2013.01); *H04N 21/4402* (2013.01); *H04N 21/44213* (2013.01); *H04W 8/22* (2013.01); *H04W 64/003* (2013.01)

(58) Field of Classification Search
CPC .................... H04W 4/02–4/028; H04W 48/04
USPC ......................................................... 709/221
See application file for complete search history.

(56) References Cited

U.S. PATENT DOCUMENTS

| | | | |
|---|---|---|---|
| 6,446,004 B1 | 9/2002 | Cao et al. | |
| 7,813,950 B2 | 10/2010 | Perrella et al. | |
| 7,848,765 B2* | 12/2010 | Phillips et al. | 455/456.3 |
| 8,037,485 B1* | 10/2011 | Goldman | 719/328 |
| 8,265,928 B2* | 9/2012 | Kristjansson et al. | 704/227 |
| 8,285,344 B2* | 10/2012 | Kahn et al. | 455/570 |
| 2003/0028390 A1 | 2/2003 | Stern et al. | |

(Continued)

OTHER PUBLICATIONS

Locale Android App for relevant release version described, see: http://web.archive.org/web/20100923021009/http://blog.twofortyfouram.com/tagged/Release+Notes/page/2) For a demonstration of this App, see: Become and Android Power User with Locale—AppJudgment (Apr. 23, 2010) http://www.youtube.com/watch?v=sWEuuLolarE.*

(Continued)

*Primary Examiner* — Dede Zecher
*Assistant Examiner* — Vadim Savekov
(74) *Attorney, Agent, or Firm* — Jim Ross; Micky Minhas

(57) ABSTRACT

A computing device's settings, specifically audio or video settings are adjusted based on a status and/or location of an event participant carrying the device. An event coordination service or an application on the computing device may match the participant's status and location to event location information. Upon matching either status or location, the computing device's settings may be modified to prevent audio feedback by any audio equipment at the event location or similar video interference.

17 Claims, 7 Drawing Sheets

(56) References Cited

U.S. PATENT DOCUMENTS

| | | | | |
|---|---|---|---|---|
| 2006/0030338 A1* | 2/2006 | Harken et al. | ............. | 455/456.6 |
| 2007/0143499 A1* | 6/2007 | Chang | ........................... | 709/245 |
| 2008/0161020 A1 | 7/2008 | Malon | | |
| 2008/0214211 A1* | 9/2008 | Lipovski | .................... | 455/456.4 |
| 2008/0280591 A1* | 11/2008 | Opaluch | ....................... | 455/410 |
| 2009/0119246 A1 | 5/2009 | Kansal | | |
| 2009/0248824 A1 | 10/2009 | Best et al. | | |
| 2011/0095876 A1* | 4/2011 | Tanaka | ...................... | 340/407.1 |

OTHER PUBLICATIONS

Context-Aware Pervasive Systems Architectures for a New Breed of Applications Seng Loke © 2007 by Taylor & Francis Group, LLC.*

Smart Microphone for howling prevention: A contextaware audio device E. Berdahl; D. Harris © 2010 IEEE.*

A Conceptual Framework and a Toolkit for Supporting the Rapid Prototyping of Context-Aware Applications Anind K. Dey; Gregory D. Abowd; Daniel Salber 2001.*

Grønli, et al., "A Context-Aware Meeting Room Mobile Interaction and Collaboration using Android, Java ME and Windows Mobile", Retrieved at << http://ieeexplore.ieee.org/stamp/stamp.jsp?arnumber=05615815 >>, IEEE 34th Annual Computer Software and Applications Conference Workshops (COMPSACW), Jul. 19-23, 2010, pp. 311-316.

Khalil, et al., "Improving Cell Phone Awareness by Using Calendar Information", Retrieved at << http://interruptions.net/literature/Khalil-Interact05.pdf >>, In the Proceedings of Interact, 2005, pp. 14.

\* cited by examiner

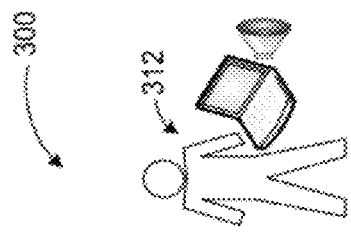
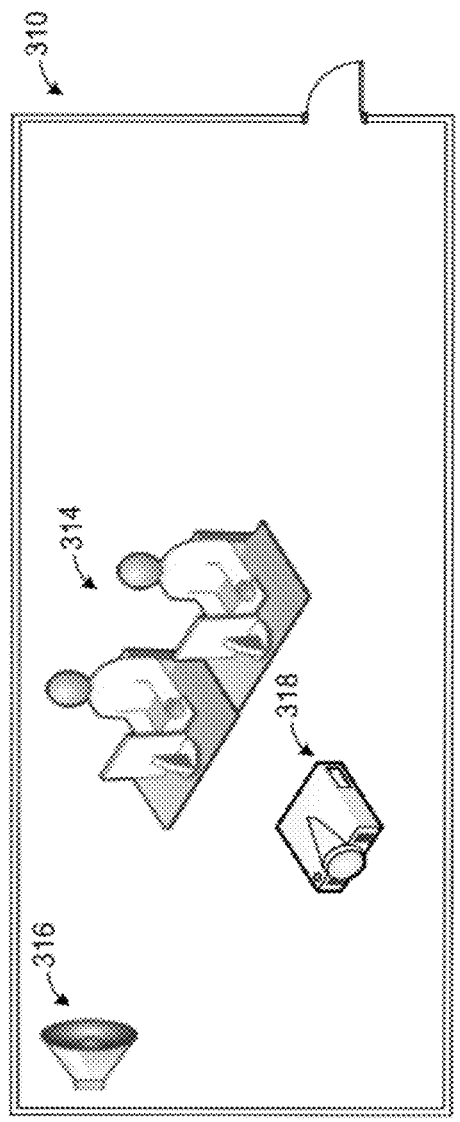
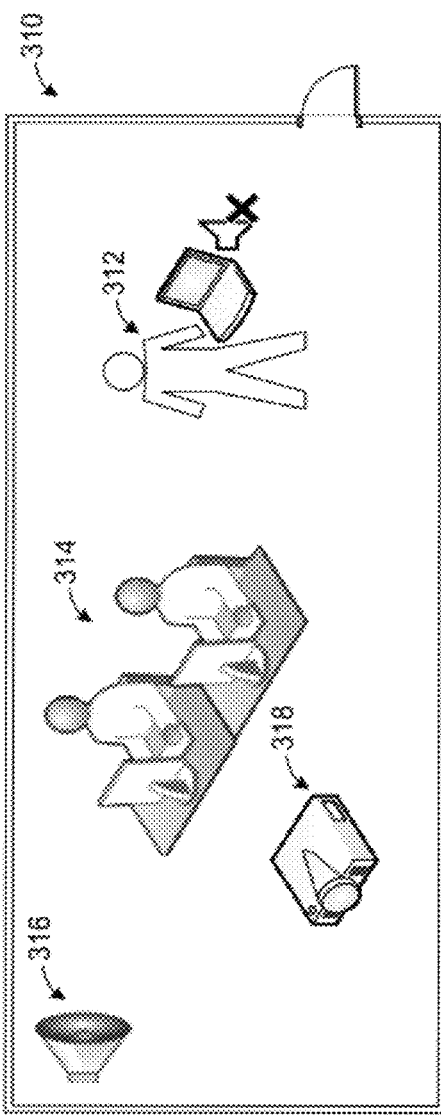
FIG. 3A
FIG. 3B

MOBILE DEVICE CONFIGURATION BASED ON STATUS AND LOCATION

BACKGROUND

The proliferation of digital communication has enabled economic and social changes not imagined in previous cultures. Digital signals carried by wire or transmitted wirelessly enable multiple parties to engage in a variety of remote venues including business and personal activities. Instant communication has enabled business entities to decentralize in order to provide work environments better suited to demand. Decentralization of work environments has also benefited employee and clients alike by enabling employees to support client from client locations. Additionally, digital communications has enabled sharing of a variety of media. Enhanced media exchange has fulfilled variety of needs such as audio, video, data transmissions to better meet client demands.

A large number of devices to enable instant communication may also have drawbacks. Ensuring compatibility among devices is a major area of concern in enterprise environments. One example challenge facing users is audio feedback. Multiple devices utilizing speakers and microphones can produce audio feedback and negatively impact user experience in circumstances where the devices are connected such as in an online conference. Manually turning off audio hardware, to prevent audio feedback, is susceptible to non-compliance, and ultimately is inconvenient.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to configuring a computing device based on a status and a location of the user. According to some examples, a mobile device may be configured automatically by itself or an event coordination service determining a participation status of a user in an event. Upon determining the user's participation in the event (e.g. attending a conference in a meeting room with its own audio system), the mobile device's audio settings such as microphone and/or speaker may be adjusted to prevent feedback.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIGS. 3A and 3B illustrate an example configuration of a mobile device based on status and location of the user according to some embodiments;

DETAILED DESCRIPTION

Figure 1:
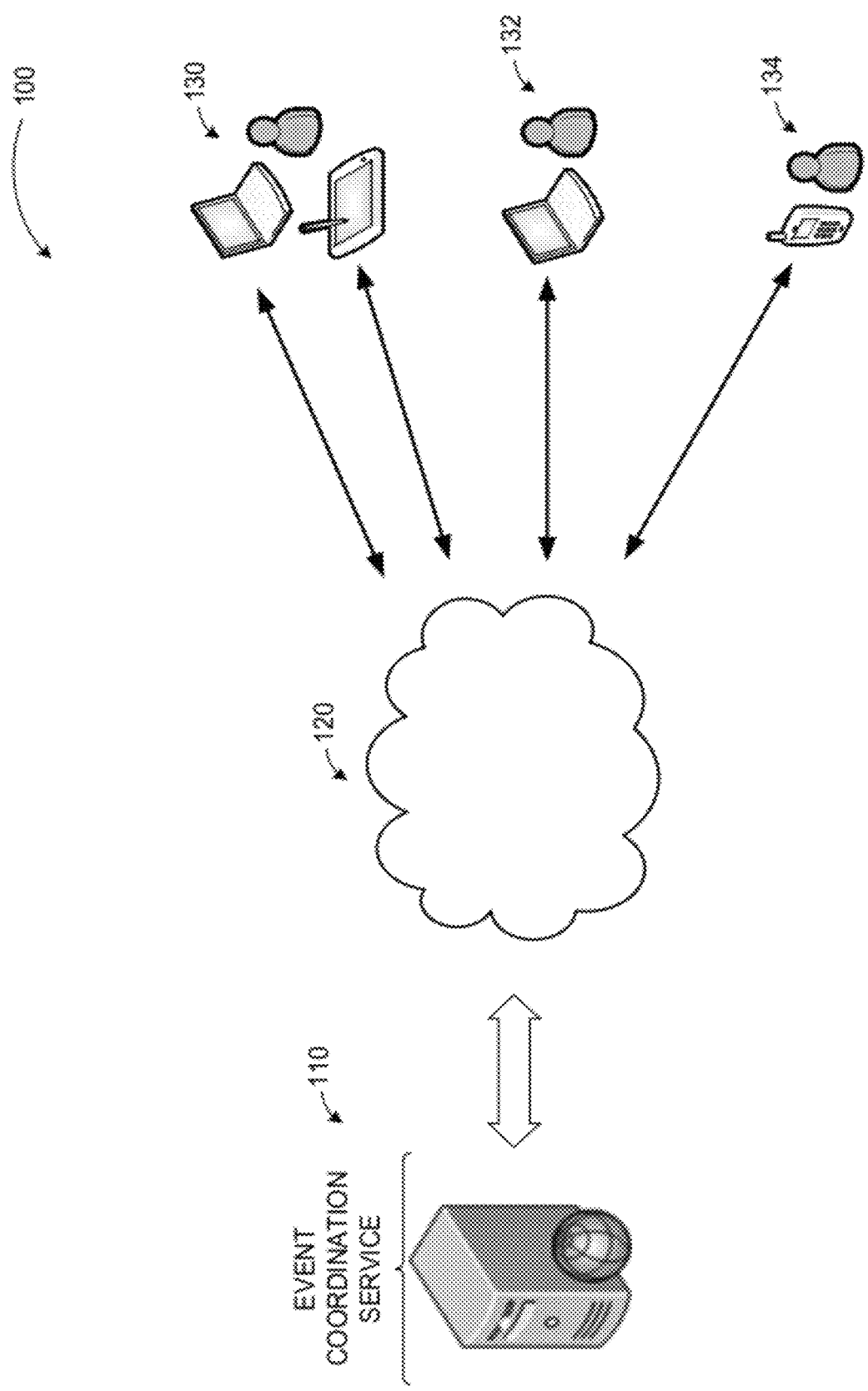
FIG. 1 is a diagram illustrating example components of a system configuring audio settings of a computing device based on user status and location.

As briefly described above, audio settings of a computing device may be configured according to a status and a location. For example, a mobile device may be configured automatically by itself or an event coordination service determining a participation status of a user in an event. Upon determining the user's participation in the event (e.g. attending a conference in a meeting room with its own audio system), the mobile device's audio settings such as microphone and/or speaker may be adjusted to prevent feedback. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer readable memory device. The computer-readable storage medium can for example be implemented via one or more of a volatile computer memory, a non-volatile memory, a hard drive, a flash drive, a floppy disk, or a compact disk, and comparable physical storage media.

Throughout this specification, the term "platform" may be a combination of software and hardware components for providing audio setting configuration services based on user presence. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram illustrating example components of a system configuring audio settings of a computing device based on user status and location. In diagram 100, the server 110 may host an event coordination service facilitating event tasks among client devices, including but not exclusive to event related messaging, calendar coordination, and participant status monitoring via network 120. The network 120 may be a local network or may be an external entity such as an internet based infrastructure. It may provide wired or wireless connectivity. Clients and event coordination service may connect to each other through unsecured or secured connectivity. An example of a secured connectivity may be a Virtual Private Network (VPN) established among the clients and the event coordination service with the use of encrypted communications.

The server 110 may facilitate events such as conferences in one or more modalities and assist in configuration of clients 130, 132, and 134 through a variety of protocols, an example of which may be the Session Initiation Protocol (SIP). The server can maintain, initiate, and end events for the clients. The server may configure hardware such as microphone and speaker on a client device. At an event start or during an event, the server 110, providing an event coordination service, may determine an event participant from a list of participants and query the participant's status. The server may determine the participant's status such as "in a meeting" by querying a client application on the client device associated with the participant. Additionally, the server may determine the location of the participant by querying any location services on the client device. Upon matching either one of the status or location parameters to the parameters of the event, the server may adjust the mobile client device's settings. In an embodiment, adjusting the mobile client device's settings may prevent audio feedback from the audio equipment at the event's location.

In an alternative embodiment, the server 110 may configure video settings of the client devices according to status and location. The server may access a client device to turn off its camera for an upcoming disclosure sensitive meeting, for example. Alternatively, the server may access the client device to adjust its camera brightness, contrast, and other settings for an optimal image and video capture according to the light levels at the event location. Embodiments are not limited to client/server and peer-to-peer architectures. Configuration of client device according to status and location of the user may be accomplished using other architectures.

Figure 2:
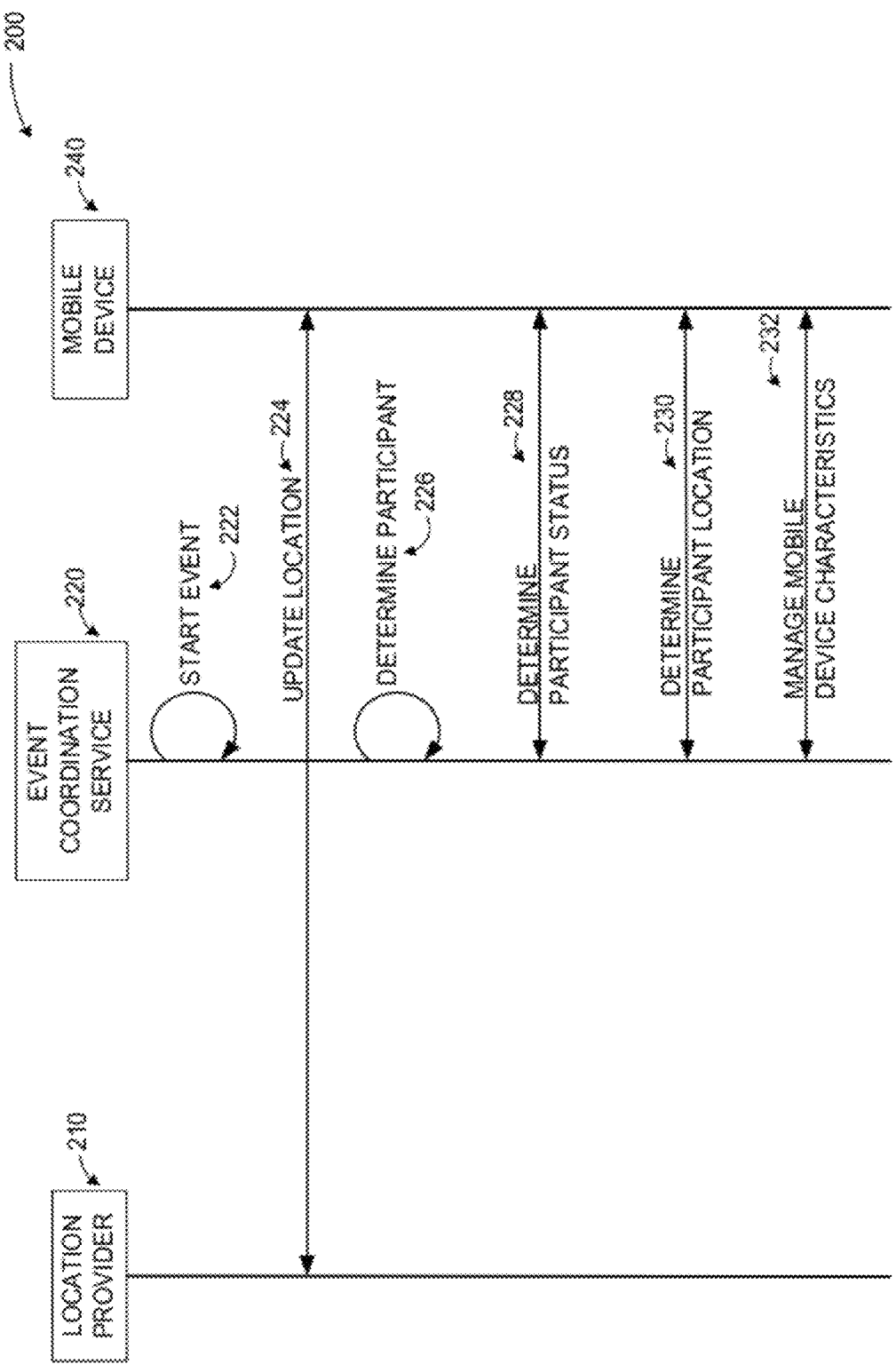
FIG. 2 illustrates an example action diagram of a status and a location based mobile device configuration.

FIG. 2 illustrates an example action diagram of a status and a location based mobile device configuration. A system according to an embodiment may configure a mobile device based on status and location of the user in order to prevent audio feedback from audio hardware in an event location. An event coordination service 220 may access the mobile device 240 and configure the mobile device 240 at the beginning or during the event. In an example scenario, the event coordination service 220 may determine a participant from a list of participants for the event. The event coordination service 220 may query mobile device 240 associated with the participant to determine the status of the participant. In addition, the event coordination service 220 may determine the location of the participant by querying available Global Positioning System (GPS) or connected access point based location triangulation services. In some embodiments, the location of the participant may be determined by querying an access control system. For example, a centralized access control system may know the location of the participant based on the participant swiping a magnetic or Radio Frequency Identification (RFID) base card as they enter a meeting room, etc. Alternatively, the mobile device 240 may be in communication with other nearby computing devices (e.g., through near field communications, optical communications, etc.), which may report the presence of the mobile device 240 in a particular location to a centralized system.

Upon matching either the status or the position of the mobile device 240 with the status and location parameters of the event location, the event coordination service may adjust the settings of the mobile device. In an embodiment, the audio settings of the device may be adjusted to predetermined parameters to prevent audio feedback through the audio equipment at the event location.

Diagram 200 illustrates some example concepts in configuring mobile device settings based on status and location according to embodiments. In an embodiment, an event coordination service 220 may start an event 222. The event may be a meeting, a conference, a conference call, an interview, etc. The event is not limited to the above-listed, but may be any occasion requiring the utilization of a resource such as a room that may have hardware resources such as speaker(s) and microphone(s). During or prior to the event, a mobile device 240 may update its location 224 by querying a location provider 210. The location provider may be GPS satellites providing coordinate information to the GPS services on the mobile device. Alternatively, the location provider may be a triangulation service on the connected access points or on the mobile device determining the relative position of the mobile device in relation to the access points. The mobile device may update its location information on a predetermined schedule or on demand basis as requested by applications executing on the mobile device or by external resources such as the event coordination service.

Next, the event coordination service 220 may determine a participant 226. The participant may be selected from a calendar application of the event coordination service that lists the participants for the event. Alternatively, the list of participants may be retrieved from an external calendar provider combining calendar, task, and messaging functions. In yet another scenario, the event coordination service may host calendar, task, messaging, and any other necessary services to manage the event.

Upon determining the participant, the event coordination service may determine the participant's status 228. The participant status may be determined by querying the mobile device associated with the participant. In an embodiment, the mobile device may be executing a client calendar application maintaining a schedule of the daily activities of the participant. The event coordination service may query the client calendar application to determine the participant's status and compare it against the event information. In an example scenario, the participant may have an "in a meeting" status which may match the event information describing a meeting. Upon matching the participant status and the event information, the event coordination service may proceed to determine the location of the mobile device, as such the location of the participant carrying the mobile device. In an alternative example scenario, a participant status of "in vacation" may not match the event information describing a meeting. Upon a negative match of the status, the event coordination service may still proceed to determine the location of the mobile device. However, upon the negative match and a subsequent negative proximity determination to the event, the event coordination service may not attempt to adjust the settings of the mobile device.

Determining the location of the participant 230 may be by querying the mobile device. The mobile device may retrieve its location information from a location provider as described above. Additionally, the location matching parameters may be predetermined or may be a range. An example of a predetermined location parameter is the mobile device being within 10 meters of the event location. An example of a range based location parameter is the mobile device being within 1 to 5 meters of the event location. Alternatively, the location matching parameters may be dynamically configurable to extend or reduce a circumference within which the mobile device may be considered in proximity to the event.

Upon determining a location in proximity to the event, the event coordination service may proceed to manage the mobile device's settings 232 such as sensitivity of microphone(s) and volume of speaker(s). Managing the mobile device's settings may be in order to prevent audio feedback through the event location's audio equipment. Alternatively, mobile device's video settings may be managed to comply with event parameters or to better situate the mobile device to capture images or video according to the event location's light settings.

The described mobile device configurations are for illustration purposes. Other mobile device adjustments may be used to configure a mobile device according to status and location. Furthermore, configuration of a computing device settings (e.g., for the purpose of preventing audio feedback) may be performed by an application executed on the computing device itself, instead of a communicatively coupled service. For example, a special purpose application or a module of the device's operating system may check the user's status and location as described above and then adjust audio, video, or other settings based on the determination.

FIGS. 3A and 3B illustrate an example configuration of a mobile device based on status and location of the user according to some embodiments. Diagram 300 illustrates stages of adjusting a mobile device's audio settings away from and within the location of an event. A participant 312 may have a mobile device such as a laptop with a microphone and a speaker. The participant may be outside an event location such as a room 310. The event may have multiple participants 314 already active within the event location. The event participants may be using a projector 318 and a speaker 316 to display and listen to event material.

In FIG. 3B, the participant 312 moves to the proximity of the event such as room 310. The multiple event participants may continue using projector 318 and speaker 316 to display and listen to event material. The event coordination service may mute the speaker and microphone of the participant 312's laptop computer to prevent undesirable audio feedback.

In an example embodiment, the event coordination service may configure the mobile device according to a status and a location of the mobile device by determining the status of the participant 312. The status and location of the participant 312 may be determined from published presence information associated with the participant, for example. If the system determines that participant 312 is supposed to attend the event in room 310 and his/her location is in the room or about to enter the room, it may send instructions to the participant's laptop to turn off or adjust its audio settings such that audio feedback can be avoided when the participant is actually in the room and the room's audio system is active.

In another example embodiment, the status and location of the participant may be retrieved from a calendar application on the participant's mobile device or a calendar server storing the status and location information for the participant. Alternatively, the location information may be determined by accessing the mobile device and querying the location from a GPS service on the mobile device. Additionally, determining the location may be by accessing the mobile device and querying the location by triangulating the location from one or more connected access points.

In further embodiments, the event coordination service may adjust the settings of the participant's mobile device by muting a microphone and a speaker on the mobile device upon matching either status or location of the participant to the event location information. Alternatively, the event coordination service may adjust the settings by turning down a microphone and a speaker of the mobile device to a predetermined setting for each. In yet another embodiment, the event coordination service may adjust the setting of the mobile device by turning off a video camera on the mobile device. Alternatively, the event coordination may adjust the setting of the mobile device by reducing a brightness setting and/or a contrast setting of the video camera to a predetermined value. The event coordination service may not adjust a setting but opt to access the mobile device and display an alert on the mobile device indicating to the participant to adjust the setting. As discussed above, the settings may also be adjusted by an application or the operating system of the mobile device.

According to some embodiments, the predetermined settings for a speaker and microphone volume levels may be a mute value for each. The event coordination service may access mobile devices of a variety of types including but not exclusive to a smart phone, a cellular phone, a laptop computer, and a tablet computer. In an alternative example, the predetermined settings for the microphone and speaker volumes may be a range for each to be adjusted to an optimum volume to prevent feedback from the event location's audio equipment settings. The audio equipment settings for the event location may include a speaker and a microphone level of the event audio equipment. Additionally, the event coordination service may reset the microphone sensitivity and speaker volume of the mobile device to the prior setting upon conclusion of the event.

The scenarios discussed above are provided as example embodiments. Other scenarios may be used to configure a mobile device based on user status and location using the principles discussed herein.

Figure 4:
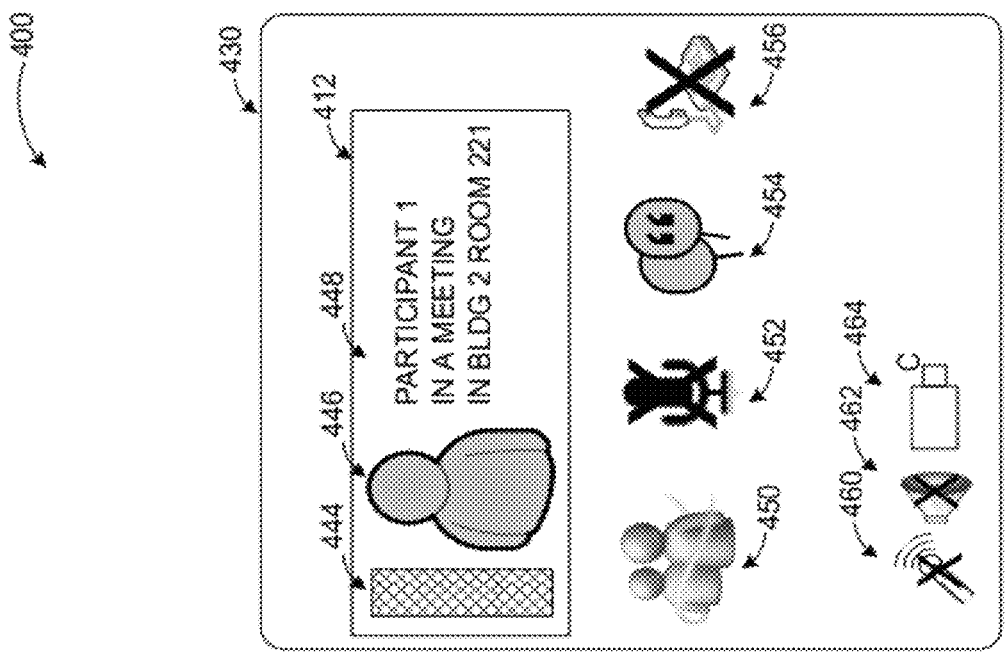
FIG. 4 is an example user interface displaying computing device audio settings configured according to status and location of the user.
Figure 4:
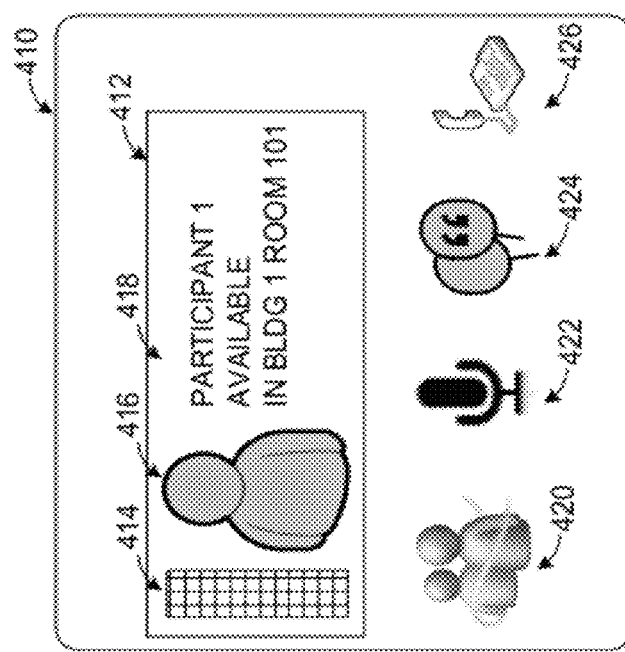

FIG. 4 is an example user interface displaying computing device audio settings configured according to status and location of the user. In diagram 400, user interface 410 may display a participant's status by showing a visual indicator 414 corresponding to the participant's status. The "USER 1" represented by image 416 may have an "AVAILABLE" status 418 in a location such as "IN BLDG. 1 ROOM 101" displayed on panel 412. User interface 410 may also display active icons enabling a user to launch components that may perform other activities. One component icon may launch a multi-tiered communication application 420 such as a video chat application. Another component icon 422 may launch an audio recording application. A text messaging icon 424 may launch a text based messaging application. Additionally, a telephone icon 426 may launch a telephony application.

User interface 430 illustrates after the computing device settings have been altered based on user status and location. The user interface may indicate the user status with an indication 444 changed to match "IN A MEETING" status 448 of "USER 1" represented by image 446 "IN BLDG. 2 ROOM 221" displayed in panel 412. Active icons 450 and 454 are still available to launch multi-tiered and text based communication applications to communicate with others during the event. However, audio recording icon 452 and telephone application icon 456 are unavailable to prevent audio feedback through the audio equipment at the event location during the meeting. Additionally, the user application may display notification microphone 460 and speaker 462 icons crossed out to alert the participant about the unavailability of mobile device audio features during the meeting. Alternatively, the application may display a camera icon 464 to display availability or unavailability of mobile device's camera during the meeting.

The systems and implementations of computing device configuration according to status and location discussed above are for illustration purposes and do not constitute a limitation on embodiments. Configuring the computing device according to status and location may be implemented by an application layer and an application user interface. The configuration may be accomplished by a variety of adjustments including adjusting audio settings of the computing device. Configuring the computing device settings may be implemented employing other modules, processes, and configurations using the principles discussed herein.

Figure 5:
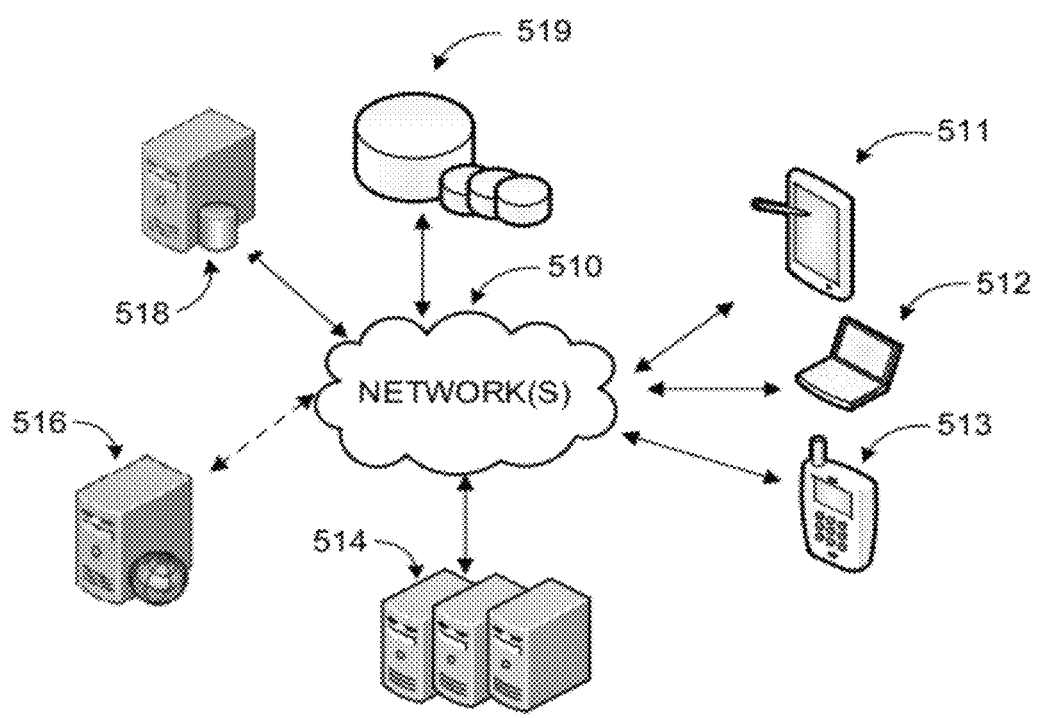
FIG. 5 is a networked environment, where a system according to embodiments may be implemented.

FIG. 5 is an example networked environment, where embodiments may be implemented. Configuring a computing device may be initiated via software executed over one or more servers 514 or a single server (e.g. web server) 516 such as a hosted service. The platform may communicate with client applications on individual computing devices such as a smart phone 513, a laptop computer 512, or tablet computer 511 ('client devices') through network(s) 510.

As discussed above, an event coordination service may adjust the computing device according to status and location. A matching status or location of the participant to the event information may cause the adjustment of settings on the client devices 511-513. Adjustments may be performed on audio hardware to prevent audio feedback from the audio equipment in the event location.

Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to configure settings on a mobile device according to status and location. Furthermore, the networked environments discussed in FIG. 5 are for illustration purposes only. Embodiments are not limited to the example applications, modules, or processes.

Figure 6:
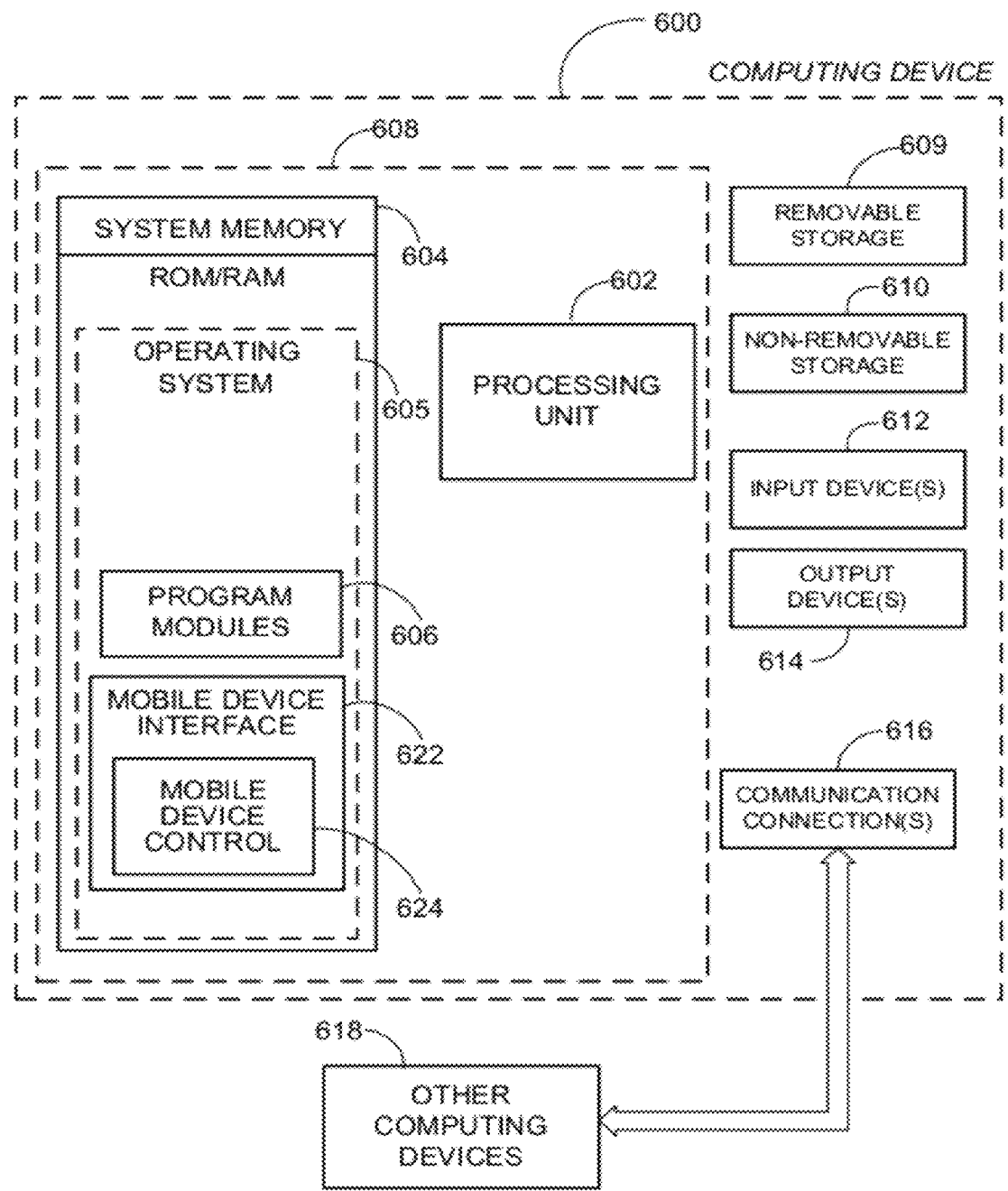
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, mobile device interface 622, and mobile device control module 624.

Mobile device interface 622 may be part of an event coordination service that configures mobile device settings according to status and location. Mobile device control module 624 may adjust hardware such as microphone and speaker on a mobile device to prevent audio feedback at an event location. Matching either the status or location of a participant's mobile device to the event information may result in adjusting the settings on the mobile device. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
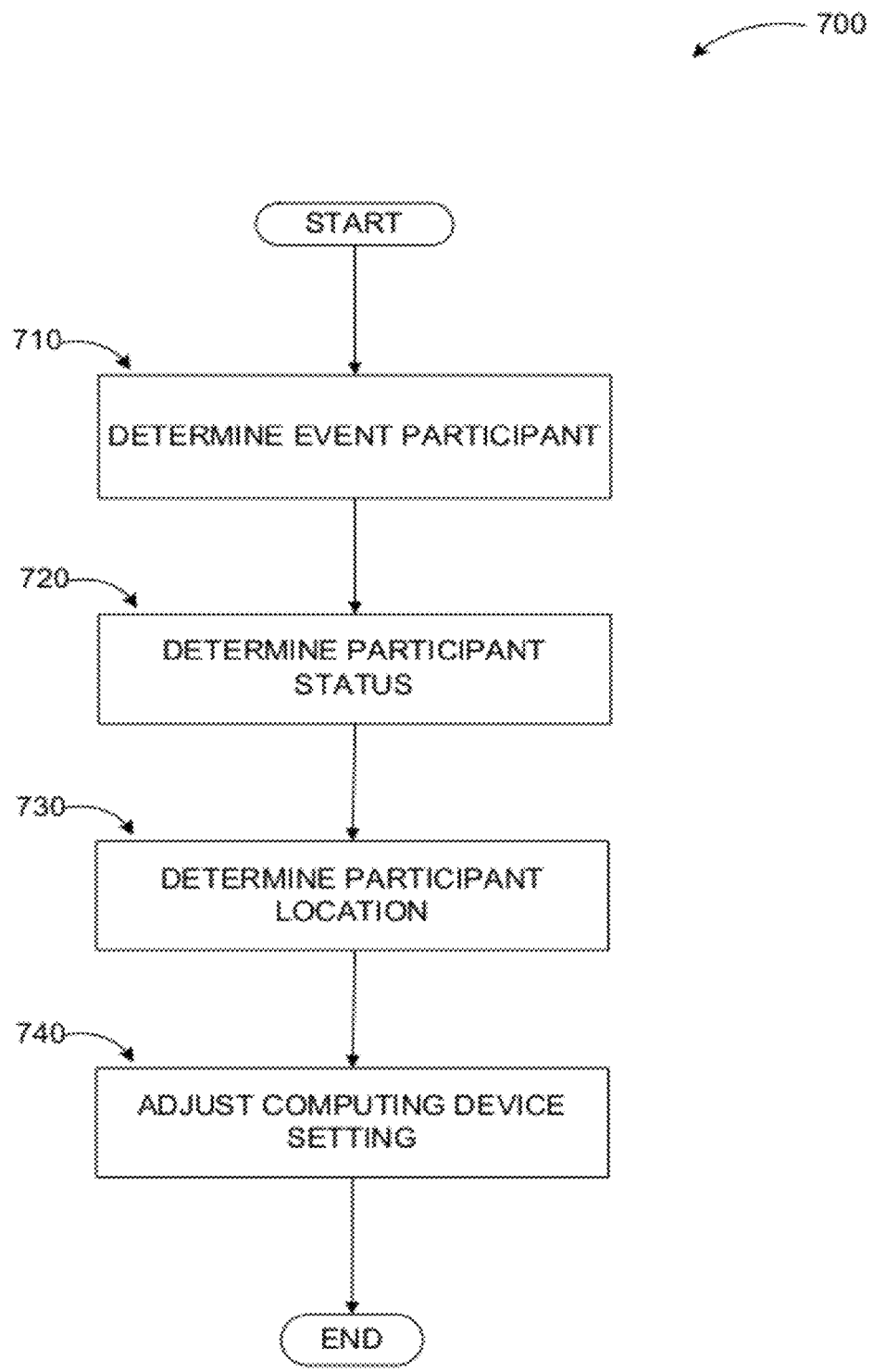
FIG. 7 illustrates a logic flow diagram for a process configuring audio settings of a computing device based on status and location of the user according to embodiments.

FIG. 7 illustrates a logic flow diagram for a process 700 of configuring a computing device based on status and location according to embodiments. Process 700 may be implemented by an event coordination service on any computing device.

Process 700 may begin with determining an event participant at operation 710 followed by determining the participant's status at operation 720. The participant's location may be determined at operation 730. Then, the participant's computing device settings may be adjusted as discussed above according the status and location at operation 740 (e.g., microphone or speaker volume levels in order to prevent audio feedback by any audio equipment at the event location).

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Configuring a computing device based on status and location according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for configuring a computing device setting according to a status and a location, the method comprising:

determining a participant for an event from a list of participants provided by querying an application associated with the event, wherein the event is an occasion occurring in the location that includes hardware, including one or more of a speaker and a microphone;

determining the status of the participant by querying a client application executed on a client device associated with the participant;

determining the location of the participant by querying a location provider to update the location of the client device periodically based on a predetermined schedule;

retrieving the location of the participant by querying one or more of: a Global Positioning System (GPS) service on the computing device and a network triangulation based location service on the computing device;

providing a display of the status and the location of the participant;

sending instructions to the computing device to at least one of: turn off and adjust one or more of a video setting and an audio setting associated with the computing device in response to a determination of an active audio system in a room associated with the event and based on the location and the status of the participant, wherein the active audio system is associated with at least one from a set of: the participant is in the room, the participant is to attend the event, the participant is about to enter the room; and adjusting at least one of the audio setting and the video setting of the computing device associated with the participant based on the location and the status of the participant to reduce audio feedback based on one or more of: an audio equipment setting at the location and the computing device setting at the location by:

reducing a microphone sensitivity of the computing device to a range of predetermined settings for the microphone to prevent the audio feedback based on the audio equipment setting of the location and the computing device setting at the location; and reducing a speaker volume of the computing device to the range of predetermined settings for the speaker to prevent the audio feedback based on the audio equipment setting of the location and the computing device setting at the location.

2. The method of claim 1, wherein the computing device setting includes at least one of the audio setting and the video setting.

3. The method of claim 1, further comprising:
retrieving the status of the participant from a calendar application on the computing device.

4. The method of claim 1, further comprising:
retrieving the status of the participant from one of a calendar server and a presence server.

5. The method of claim 1, further comprising:
determining the location of the participant based on one of querying an access control system and receiving a location feedback from a nearby computing device.

6. The method of claim 1, wherein adjusting the setting includes at least one from a set of:
muting the microphone of the computing device; and
muting the speaker of the computing device.

7. The method of claim 1, wherein adjusting the setting includes:
turning off a video camera of the computing device.

8. The method of claim 1, wherein adjusting the setting includes:
reducing at least one of a brightness setting and a contrast setting of a video camera of the computing device to predetermined settings for each.

9. The method of claim 1, wherein adjusting the setting includes:
causing an alert to be displayed on the computing device to have the participant adjust the setting.

10. A computing device capable of automatically adjusting settings based on a status and a location, the computing device comprising:
- a communication module;
- a memory;
- a processor coupled to the memory, the processor hosting an event coordination service configured to execute an application in conjunction with instructions stored in the memory to adjust the settings according to the status and the location, wherein the application is configured to:
  - determine a participant for an event;
  - determine the status of the participant by querying a client application executed on a mobile device associated with the participant for published presence information;
  - determine the location of the participant;
  - retrieve the location of the participant by querying one or more of: a Global Positioning System (GPS) service on the computing device and a network triangulation based location service on the computing device;
  - display at least one active icon of at least one associate application based on the status and the location of the participant to enable the participant to launch the at least one associate application wherein the associate application includes one from a set of: a multi-tiered communication application, a text based communication application, a video chat application, and a telephony application; and
  - adjust at least one of a video setting and an audio setting of the computing device based on the location and the status of the participant to reduce audio feedback based on one or more of: an audio equipment setting at the location and a mobile device setting at the location by:
    - reducing a microphone sensitivity of the computing device to a range of predetermined settings for the microphone to prevent the audio feedback based on the audio equipment setting of the location and the mobile device setting at the location; and
    - reducing a speaker volume of the computing device to a range of the predetermined settings for the speaker to prevent the audio feedback based on the audio equipment setting of the location and the mobile device setting at the location.

11. The computing device of claim 10, wherein the predetermined settings for the microphone sensitivity and the speaker volume are a mute value for each.

12. The computing device of claim 10, wherein the computing device is one of a smart phone, a cellular phone, a laptop computer, and a tablet computer.

13. The computing device of claim 10, wherein the application is further configured to:
- adjust at least one from a set of: an operation status of a camera, an operation status of the display, a brightness setting of the camera, and a contrast setting of the camera associated with the computing device.

14. The computing device of claim 10, wherein the application is further configured to:
- reset the microphone sensitivity to a prior setting upon conclusion of the event; and
- reset the speaker volume to the prior setting upon conclusion of the event.

15. A computer-readable memory device with instructions stored thereon for configuring a mobile device setting based on a status and a location, the instructions comprising:
- determining a participant for an event from a list of participants provided by querying an application associated with the event, wherein the event is an occasion occurring in the location that includes hardware, including one or more of a speaker and a microphone;
- determining the status of the participant by querying a client application executed on the mobile device associated with the participant;
- determining the location of the participant by querying a location provider to determine the location within a predefined location range parameter on a demand basis as requested by the client application executed on the mobile device;
- retrieving the location of the participant by querying one or more of: a Global Positioning System (GPS) service on the computing device and a network triangulation based location service on the computing device;
- providing a display of the status and the location of the participant;
- sending instructions to the computing device to at least one of: turn off and adjust one or more of a video setting and an audio setting associated with the computing device in response to a determination of an active audio system in a room associated with the event and based on the location and the status of the participant, wherein the active audio system is associated with at least one from a set of: the participant is in the room, the participant is to attend the event, the participant is about to enter the room;
- displaying at least one active icon of at least one associate application based on the status and the location of the participant to enable the participant to launch the at least one associate application wherein the associate application includes one from a set of: a multi-tiered communication application, a text based communication application, a video chat application, and a telephony application; and
- adjusting at least one of the audio setting and the video setting of the mobile device associated with the participant based on the location and the status of the participant to reduce audio feedback based on one or more of: an audio equipment setting at the location and the mobile device setting at the location by:
  - reducing a microphone sensitivity of the mobile device to a range of predetermined settings for the microphone to prevent the audio feedback based on the audio equipment setting of the location and the mobile device setting at the location; and
  - reducing a speaker volume of the mobile device to a range of the predetermined settings for the speaker to prevent the audio feedback based on the audio equipment setting of the location and the mobile device setting at the location.

16. The computer-readable memory device of claim 15, wherein the status of the participant is determined from published presence information of the participant.

17. The computer-readable memory device of claim 16, wherein adjusting at least one of the audio setting and the video setting of the mobile device further includes:
- adjusting at least one from a set of: an operation status of a camera, an operation status of the display, a brightness setting of the camera, and a contrast setting of the camera associated with the mobile device; and
- resetting the at least one adjusted settings to a prior value upon conclusion of the event.

* * * * *